April 27, 1948.   L. T. KINCANNON   2,440,338
OUTBOARD MOTOR LUBRICATION
Filed Nov. 15, 1946

INVENTOR
Leo T. Kincannon.
BY: Louis O. French
ATTORNEY

Patented Apr. 27, 1948

2,440,338

UNITED STATES PATENT OFFICE 2,440,338

OUTBOARD MOTOR LUBRICATION

Leo T. Kincannon, Milwaukee, Wis., assignor to Metal Products Corporation, Milwaukee, Wis., a corporation of Wisconsin Application November 15, 1946, Serial No. 710,208

1 Claim. (Cl. 184—6)

The invention relates to outboard motors and more particularly to means for lubricating the propeller shaft and the gearing connecting said shaft with the drive shaft.

In outboard motors the gear housing in which the propeller shaft is mounted has been lubricated by periodically packing this housing with grease or other heavy lubricant. It frequently happens that the operator neglects to fill this housing with lubricant, and as a result either the gears or the shafting connected therewith or both become scored from running dry and have to be replaced. The object of this invention is to provide a means for supplying lubricant to the propeller shaft gear housing without the necessity for separate renewal of lubricant in said housing after the same has received its initial supply of lubricant. More particularly, I have found that the oil or lubricant used in the crankcase of the engine can be used to lubricate the propeller shaft gears and that if some of this oil is conducted from the crank case to said propeller shaft housing, that the usual difficulties of lubricating the propeller shaft drive are overcome and the housing for said drive does not have to be separately lubricated. As a result with my arrangement so long as the crankcase of the motor is supplied with lubricant, the propeller shaft drive will likewise be lubricated without any thought on the part of the operator.

The invention further consists in the several features hereinafter described and more particularly defined by the claim at the conclusion hereof.

Figure 1:
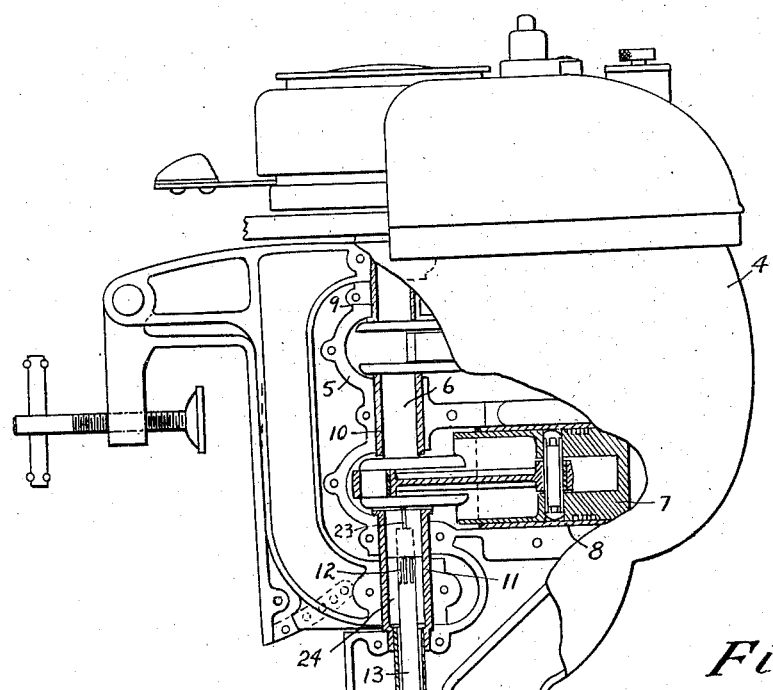
Fig. 1 is an elevation view of an outboard motor embodying the invention, parts being broken away and parts beings shown in section.

Referring to the drawings, the numeral 4 designates generally an outboard motor, 5 the engine crankcase, 6 the crank shaft operatively connected to the pistons 7 working in the cylinders 8, said crank shaft being journalled in bearing bushings 9, 10, and 11.

The crankshaft 6 has a splined bore in which the splined end 12 of the drive shaft 13 slidably fits and forms a driving connection therewith.

The drive shaft 13 extends down through and in spaced relation with a tubular shaft housing 14 which is connected at its lower end to a shaft bearing bushing 15 which extends into the propeller shaft housing 16 in which the propeller shaft 17 having the propeller 18 operatively connected thereto is rotatably mounted in bearing bushings 19 and 20. The propeller shaft 17 and the drive shaft 13 are drivingly connected together by the bevel gears 21 and 22. The housing is provided with the usual plug covered inlet by which lubricant may be supplied to it, but this inlet is only used in initially filling the housing 16 with a suitable lubricant after which said housing is supplied with lubricant from the lubricant in the crankcase 5 of the engine. For this purpose either the crank shaft 6 or the bushing 11 is provided with an oil groove 23 which extends part way into the bushing 11 and which due to the normal clearance between the bushing and shaft permits lubricant to pass from said crank case into the space 24 of the bushing 11 beyond the splined end of the crank shaft 6.

The shaft 13 is preferably hollow, and the lubricant in the space 24 works its way through the spaces in the splined connection between the shafts 6 and 13 into the bore 25 in the drive shaft 13 and then passes down through the same into the propeller shaft housing 16 to lubricate the gears 21 and 22 and the bearings 19 and 20. Some of the lubricant from the space 24 also passes down through the space 26 between the shaft 13 and the housing 14 to lubricate the bearing 15.

Figure 2:
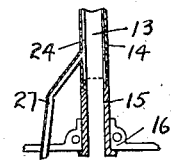
Fig. 2 is a detailed sectional view showing certain modifications.
Figure 3:
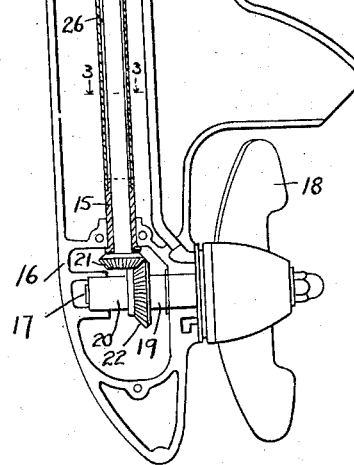
Fig. 3 is a detailed sectional view taken on the line 3—3 of Fig. 1.
Figure 3:
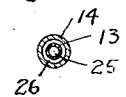

In case the shaft 13 is a solid shaft, then the lubricant from the space 24 passes directly down through the space 26 and thence some of it may pass through a small pipe or passage 27, as shown in Fig. 2, connecting said space directly with the interior of the propeller shaft housing 16, or an oil groove may be provided in the bushing 15, or instead of a groove and the passage 27 a clearance of about five-thousandths of an inch between the bushing 15 and the shaft 13 will allow sufficient oil to enter the gear case to keep it supplied with oil.

From the above it will be noted that by providing a connection between the interior of the engine crank case with the interior of the propeller shaft housing 16 and the bearings associated therewith, that these bearings and the gears 19 and 20 will always be supplied with lubricant without the necessity for the operator to separately renew the lubricant in the housing 16 as has been the usual practice.

I desire it to be understood that this invention is not to be limited to any particular form or arrangement of parts except in so far as such limitations are included in the appended claim.

What I claim as my invention is:

In an outboard motor having an engine crankcase, a crankshaft journalled in said crankcase, a propeller shaft housing, a propeller shaft mounted in said propeller shaft housing, a drive shaft housing between said crankcase and said propeller shaft housing, the combination of a hollow drive shaft operatively connected to said crankshaft and said propeller drive shaft and extending into said propeller shaft housing, and conduit means between said crankcase and the interior of said drive shaft for supplying crankcase lubricant thereto and thence to said propeller shaft housing.

LEO T. KINCANNON.

REFERENCES CITED

The following references are of record in the file of this patent:

UNITED STATES PATENTS

| Number | Name | Date |
|---|---|---|
| 1,763,970 | Johnson | June 17, 1930 |

FOREIGN PATENTS

| Number | Country | Date |
|---|---|---|
| 7,336 | Great Britain | Of 1913 |